United States Patent
Hara et al.

(10) Patent No.: US 8,208,763 B2
(45) Date of Patent: Jun. 26, 2012

(54) IMAGE PROCESSING METHOD AND APPARATUS

(75) Inventors: Yuji Hara, Machida (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 862 days.

(21) Appl. No.: 12/189,862

(22) Filed: Aug. 12, 2008

(65) Prior Publication Data

US 2009/0060390 A1 Mar. 5, 2009

(30) Foreign Application Priority Data

Aug. 29, 2007 (JP) ................................. 2007-223091

(51) Int. Cl.
 *G06T 1/20* (2006.01)
(52) U.S. Cl. .................................................... 382/303
(58) Field of Classification Search .................. 382/303
See application file for complete search history.

(56) References Cited

U.S. PATENT DOCUMENTS

| | | | | |
|---|---|---|---|---|
| 5,115,241 | A | 5/1992 | Ishikawa | 341/143 |
| 5,436,981 | A | 7/1995 | Ishikawa | 382/173 |
| 6,084,984 | A | 7/2000 | Ishikawa | 382/173 |
| 6,263,422 | B1 * | 7/2001 | Wise et al. | 712/209 |
| 7,969,473 | B2 | 6/2011 | Kotoda | |
| 2004/0196408 | A1 | 10/2004 | Ishikawa et al. | 348/616 |
| 2005/0025374 | A1 | 2/2005 | Ishikawa | 382/252 |
| 2006/0228035 | A1 | 10/2006 | Ishikawa | 382/252 |
| 2007/0183672 | A1 * | 8/2007 | Kotoda | 382/232 |
| 2007/0248288 | A1 * | 10/2007 | Nagao et al. | 382/303 |
| 2008/0186541 | A1 | 8/2008 | Takasaka et al. | 358/1.16 |

FOREIGN PATENT DOCUMENTS

| | | |
|---|---|---|
| JP | 8-214267 | 8/1996 |
| JP | 2007-208781 A | 8/2007 |

OTHER PUBLICATIONS

Office Action issued on Mar. 19, 2012 in counterpart Japanese application No. 2007-223091.

* cited by examiner

*Primary Examiner* — Jon Chang
(74) *Attorney, Agent, or Firm* — Fitzpatrick, Cella, Harper & Scinto

(57) ABSTRACT

An image processing apparatus has a plurality of serially connected image processing blocks for sequentially processing image data input thereto. After a first command for controlling the plurality of image processing blocks and image data to be processed by the plurality of image processing blocks are output to the leading image processing block, a second command indicating end of this output is output to the leading image processing block. When the second command is output from a final image processing block, the next first command and image data are output to the leading image processing block.

17 Claims, 7 Drawing Sheets

IMAGE PROCESSING METHOD AND APPARATUS

BACKGROUND OF THE INVENTION

1. Field of the Invention

The present invention relates to an image processing method and apparatus for processing image data by a plurality serially connected image processing blocks.

2. Description of the Related Art

An image processing apparatus has been disclosed in which image processing is executed by cascade (serially) connecting a plurality of image processing blocks between a command and data transmission unit 700 and reception unit 704, as illustrated in FIG. 7.

In FIG. 7, the transmission unit 700 multiplexes and transmits commands and data. Image processing blocks 701 to 703 execute image processing. From the image processing block 703 of the final stage the reception unit 704 receives a multiplexed command and data that is the result of processing. The reception unit 704 sends the transmission unit 700 an end signal 705 upon detecting completion of processing of a data group corresponding to a prescribed amount of data.

The operation of the image processing apparatus of FIG. 7 will be described with reference to the timing chart of FIG. 8. Reference numerals 800 denote the timing of an output from the transmission unit 700, and reference numerals 801 to 803 denote the timings of outputs from the image processing blocks 701 to 703, respectively.

First, a command for setting image processing parameters is transmitted from the transmission unit 700 to the image processing blocks 701 to 703, as indicated at 804. The transmitted command is propagated to each of the image processing blocks successively as indicated at 805 to 807. As a result, the setting of image processing parameters in each image processing block is carried out. Further, when data to undergo image processing is transmitted from the transmission unit 700, as indicated at 808, image processing is executed sequentially by the image processing blocks 701 to 703 as indicated at 809 to 811, respectively, after which the processed data is received by the reception unit 704.

The data 808 that is transmitted from the transmission unit 700 is transmitted in data units (by page, block or band, etc.). After the reception unit 704 senses the end position of such a data unit, it transmits the end signal 705 to the transmission unit 700. Thereafter, the setting of image processing parameters with respect to the next unit of data is started (812 to 815) by the transmission unit 700 with respect to the image processing blocks 701 to 703, and the image processing operation is executed as indicated at 816 to 819.

However, the problem described below arises when a certain image processing block among the plurality of these blocks executes processing, such as trimming processing, in which the amount of data output decreases in comparison with the amount of data input.

Assume that the image processing block 703 of the final stage in FIG. 7 executes processing (e.g., trimming processing) in which the amount of data output decreases in comparison with the amount of data input. In this case, there is the possibility that the image processing by the image processing block 703 will be completed earlier than the image processing in the image processing blocks 701, 702 and that the end signal 705 will be transmitted to the transmission unit 700 before the processing by the image processing blocks 701, 702 ends. In such case the setting of image processing parameters with regard to the next unit of data is started by the transmission unit 700 before the image processing operation of all image processing blocks ends.

When such a situation arises, internal sequencers of the image processing blocks can no longer operate normally and a normal image processing operation is no longer carried out.

SUMMARY OF THE INVENTION

The present invention seeks to prevent malfunction in a plurality of serially connected image processing blocks that process image data.

The present invention provides an image processing method in which a plurality of serially connected image processing blocks sequentially process image data input thereto, the method comprises steps of outputting, to a leading image processing block, a first command for controlling the plurality of image processing blocks, and a second command after image data to be processed by the plurality of image processing blocks is output, the second command indicating end of this output; and outputting a following first command and image data to the leading image processing block when the second command is output from a final image processing block.

The present invention further provides an image processing apparatus comprising a plurality of serially connected image processing units which sequentially process image data input thereto; an output unit which outputs, to a leading image processing unit, a first command for controlling the plurality of image processing units, and a second command after image data to be processed by the plurality of image processing units is output, the second command indicating end of this output; and a control unit which controls the output unit in such a manner that a following first command and image data are output to the leading image processing unit when the second command is output from a final image processing unit.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 7:
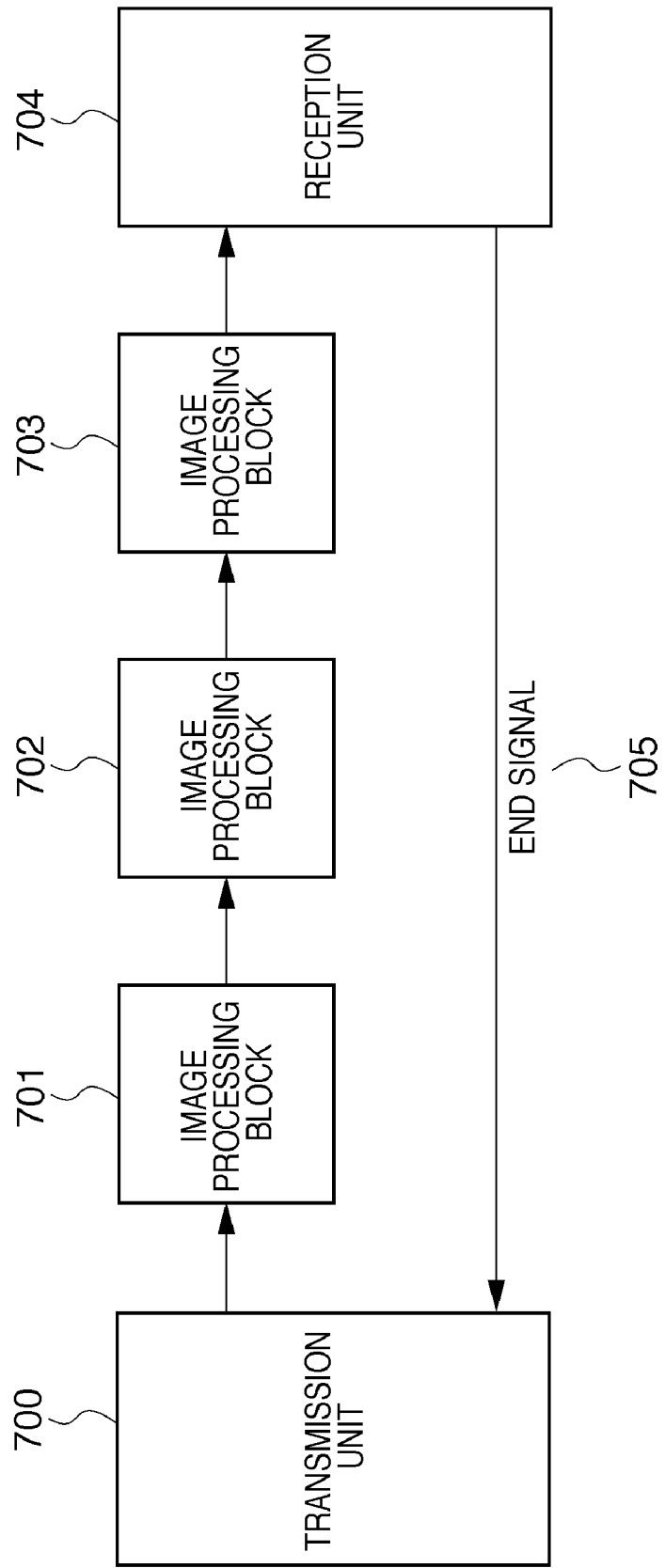
FIG. 7 is a block diagram illustrating the configuration of an image processing apparatus.
Figure 8:
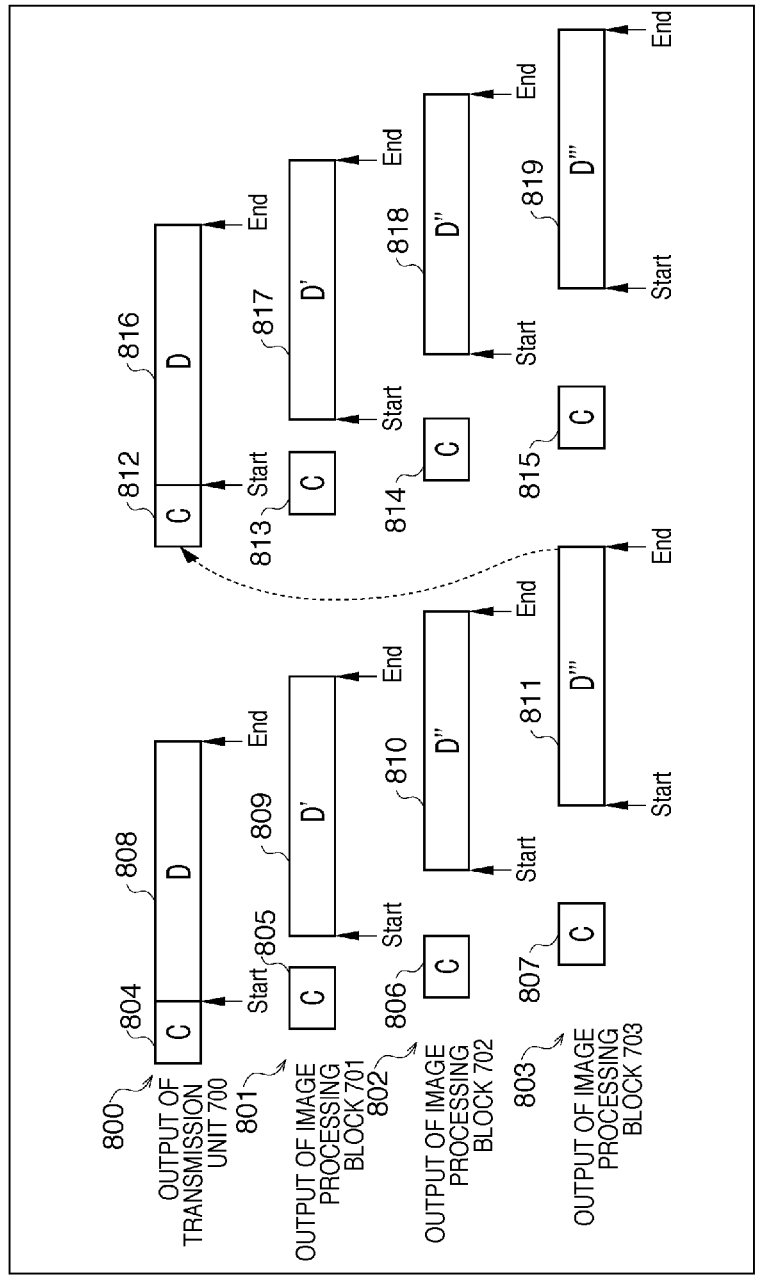
FIG. 8 is a diagram illustrating timings indicative of normal operation of an image processing apparatus according to the prior art.

The configuration of an image processing apparatus according to the first embodiment is similar to that shown in FIG. 7.

As illustrated in FIG. 7, the image processing apparatus according to this embodiment executes image processing in which the unit of data is a data group of a specific amount of data (a page, a block, a band, etc.) and includes the transmission unit 700, image processing blocks 701 to 703 and reception unit 704.

The transmission unit 700 multiplexes a command and data to be processed and transmits the multiplexed command and data to the image processing block 701.

The image processing blocks 701 to 703 are serially connected and each image processing block executes image processing using the multiplexed command and data. Each image processing block multiplexes and outputs the command and data that is the result of processing while maintaining the sequential relationship of the multiplexed command and data. The details of this processing will be described later.

The reception unit 704 receives the multiplexed command and processed data that have been output from the image processing block 703 that is the last stage of the plurality of serially connected image processing blocks.

Next, the formats of the command and data used by the image processing apparatus of the first embodiment will be described with reference to FIGS. 1 and 2. It is assumed in this embodiment that the command and data are composed of 64 bits.

Figure 1:
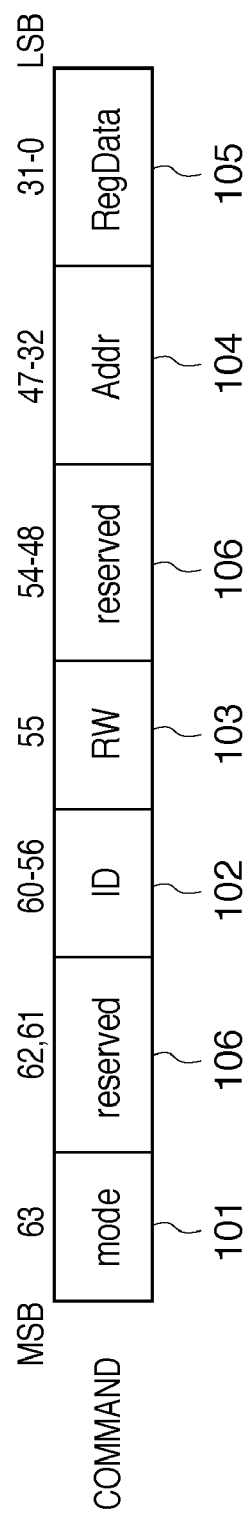
FIG. 1 is a diagram illustrating the format of a command in an embodiment of the present invention.

FIG. 1 illustrates the format of the command, in which the MSB is the $63^{rd}$ bit and the LSB the $0^{th}$ bit.

The $63^{rd}$ bit is a mode flag 101 that identifies the command and data. This bit indicates data when it is "0" and a command when it is "1".

The $56^{th}$ to $60^{th}$ bits constitute an ID 102 indicating the processing block number of the processing block to which the command is applied. That is, the ID 102 is identification information for specifying one image processing block. The $55^{th}$ bit is an RW flag 103 (changeover attribute) for designating read/write of a register. This bit indicates a read command when it is "0" and a write command when it is "1".

The $32^{nd}$ to $47^{th}$ bits constitute a register address 104, and the $0^{th}$ to $31^{st}$ bits constitute register data 105. The register address 104 (which may also be referred to as "register 104" below) is an address area for storing an address value that indicates the location from which data is read out of the register at the time of read and the location at which data is written to the register at the time of read. Further, the register data 105 is a data area for storing data that has been read from the register or data that is written to the register. The value of the register data 105 is the read register value at the time of the read command (when RW flag 103="0" holds), and is the write register value at the time of the write command (when RW flag 103="1" holds).

The $48^{th}$ to $54^{th}$ bits and the $61^{st}$ and $62^{nd}$ bits are reserved areas 106 that are unusable.

Figure 2:
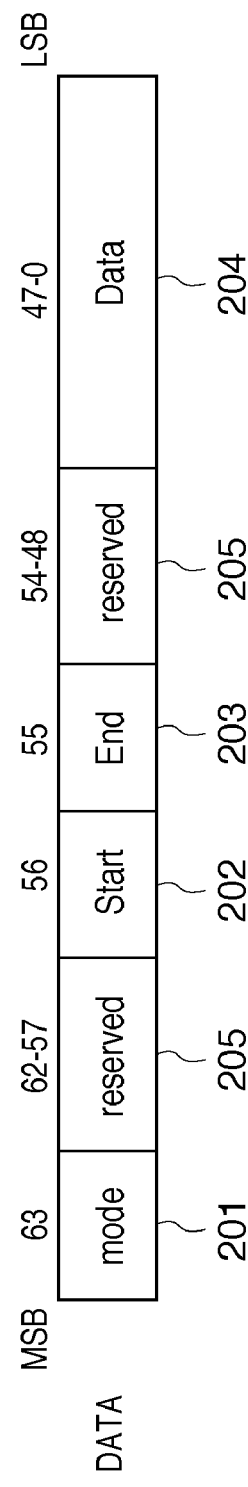
FIG. 2 is a diagram illustrating the format of data in the embodiment of the present invention.

FIG. 2 illustrates the format of the data, in which the MSB is the $63^{rd}$ bit and the LSB the $0^{th}$ bit. The $63^{rd}$ bit is a mode flag 201. This flag is similar to the mode flag 101.

The $56^{th}$ bit is a start flag 202 indicating the initial data of a certain unit of data (page, block, band, etc.). The $55^{th}$ bit is an end flag 203 indicating the final data of this data unit. The start flag and end flag provide data with a start attribute and an end attribute, respectively.

The $0^{th}$ to $47^{th}$ bits constitute data 204 that is to undergo image processing. The $48^{th}$ to $54^{th}$ bits and the $57^{th}$ to $62^{nd}$ bits constitute reserved areas 205. These areas are similar to the reserved area 106.

There are also cases where the command and data illustrated in FIGS. 1 and 2 are referred to as a command word and data word, respectively. Although the size of the command word and data word is 64 bits in this embodiment, the size is not limited to 64 bits.

Next, operation of the image processing apparatus according to this embodiment will be described with reference to the timing chart of FIG. 3. The reference numeral 300 denotes an output of the transmission unit 700. The reference numerals 301-303 denote output timings of the image processing blocks 701-703.

First, a register address, write data and identification number (ID) of an image processing block are set in the transmission unit 700 from a CPU (processor), not shown. The transmission unit 700 sends the image processing blocks 701 to 703 a command 304, which is for setting image processing parameters, in the format shown in FIG. 1. The transmitted command 304 is propagated to each of the image processing blocks successively as indicated at 305 to 307 so that the setting of image processing parameters in each image processing block is carried out. It should be noted that the commands 304 to 307 comprise one or a plurality of command words.

Figure 3:
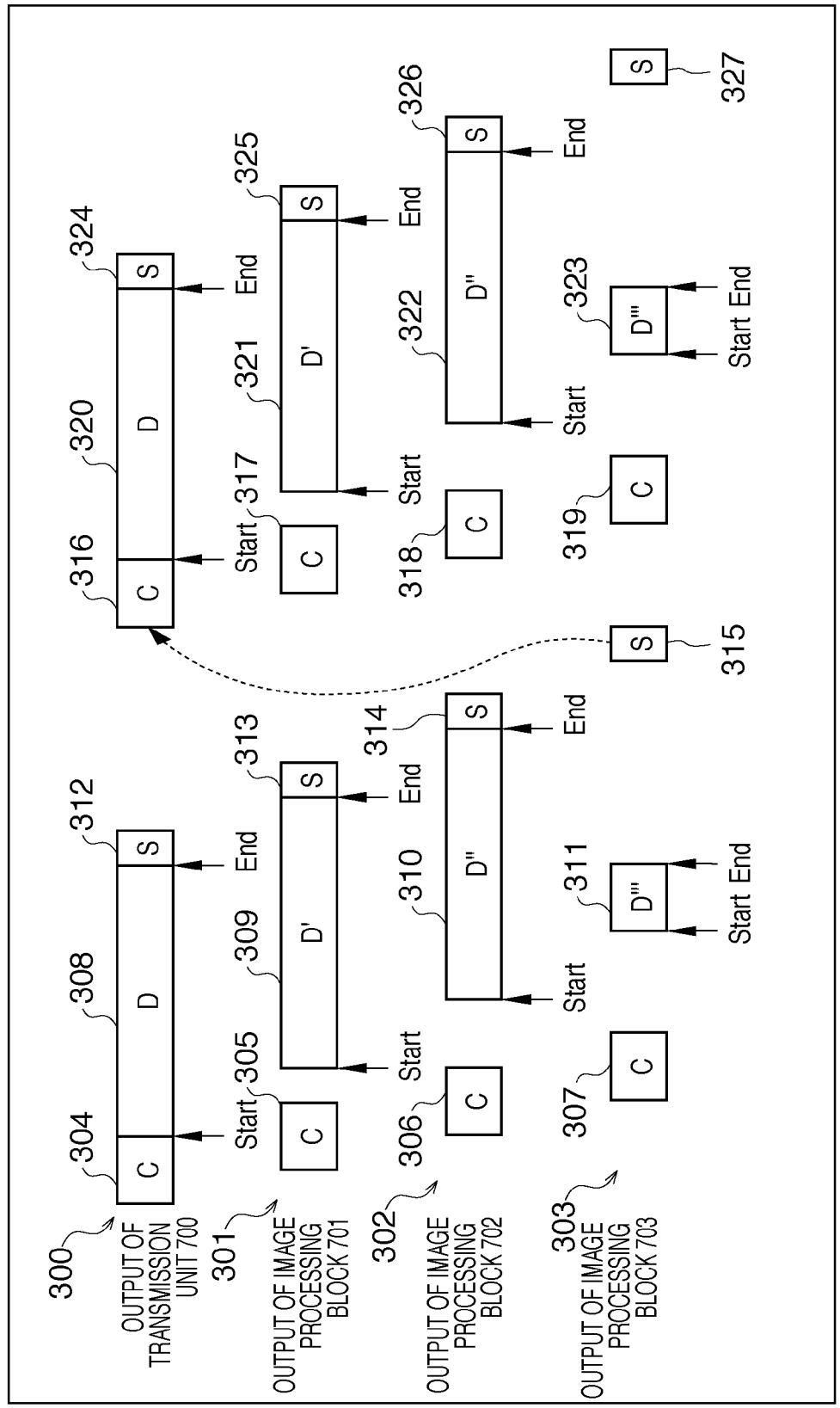
FIG. 3 is a diagram illustrating an example of timings of an image processing operation according to this embodiment.

Further, the reason why the spacing between command C and the start of data D gradually widens in FIG. 3 is that the latencies with respect to the command and data differ. In FIG. 3, the time over which the command is delayed is the same in each of the image processing blocks, and the time over which the data is delayed is the same. However, the time over which the data is delayed in each image processing block is illustrated on the assumption that it is twice the time over which the command is delayed.

Thereafter, image data in the amount of the data unit is DMA-transferred from a storage unit such as a DRAM (not shown) to the transmission unit 700 via a DMAC (not shown), whereupon the transmission unit 700 transmits data 308, which is to undergo image processing, to the image processing block 701. The transmitted data 308 is transferred to and subjected to image processing in each of the image processing blocks, as indicated at 309 to 311, and data 311 that has been output from the image processing block 703 of the final stage is received by the reception unit 704. It should be noted that the data 308 to 311 comprises one or a plurality of data words.

The data 308 that is transmitted from the transmission unit 700 is transmitted in the format of FIG. 2 in certain data units (by page, block or band, etc.). Further, the image processing block 703 executes processing, such as trimming processing, in which the amount of data (the number of data words) that is output is less in comparison with the amount of data that was input.

After transmission of the data 308 in the amount of the data unit ends, the transmission unit 700 transmits a synchronization command 312. That is, the transmission unit 700 transmits the synchronization command 312 after the final data (data word) of the data group in the unit of data is transmitted but before the command and data relating to the next data group is transmitted. The synchronization command 312 propagates through each of the image processing blocks as indicated at 313 to 315 and the synchronization command 315 is received by the reception unit 704. After it senses the synchronization command 315, the reception unit 704 transmits the end signal 705 to the transmission unit 700.

After it receives the end signal 705, the transmission unit 700 transmits a command 316 that is for the purpose of starting the setting of image processing parameters with respect to the next unit of data. From this point onward the above-described processing is repeated as indicated at 317 to 327.

Thus, in this embodiment as set forth above, the reception unit 704 notifies the transmission unit 700 of end of processing of the applicable data group in a case where the synchronization command has been received from the image processing block 703 of the final stage. After receiving the notification of end of processing from the reception unit 704, the transmission unit 700 starts the transmission of the multiplexed command and data for processing the next data group. The command includes the register address, write data and identification number (ID) of the image processing block that have been set in the transmission unit 700 from a CPU (processor), not shown. The data is DMA-transferred from a storage unit, such as a DRAM (not shown), to the transmission unit 700 via a DMAC, not shown.

In this embodiment, a command that does not cause a register-write or register-read operation in each processing block is used as the synchronization command. More specifically, and by way of example, use is made of a command in which the mode flag 101 has been set to "1" and the ID 102 has been set to an identification number that is not a duplicate of identification numbers of the image processing blocks.

Figure 4:
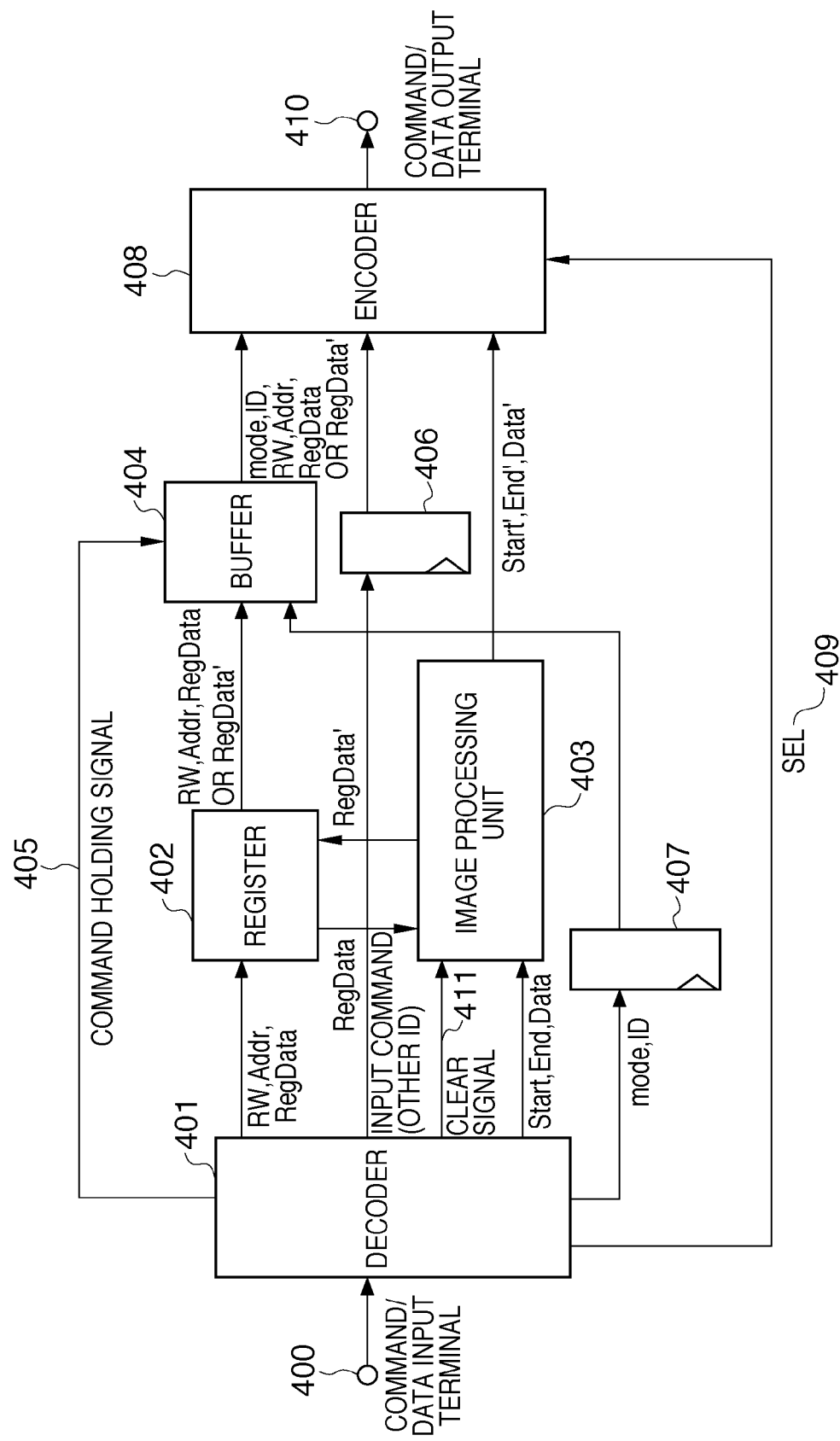
FIG. 4 is a block diagram illustrating an example of the configuration of image processing blocks in this embodiment.

The internal structure of the image processing blocks 701 to 703 in this embodiment is illustrated in FIG. 4.

Multiplexed command and data are input from a command/data input terminal 400. A decoder 401 decodes the command and data. A register 402 controls the storage, reading and writing of register data.

The image processing block further includes an image processing unit 403 and a buffer 404 for assuring the sequential relationship of the command and data. A command holding signal 405 is output from the decoder 401 to the buffer 404. A delay adjustment flip-flop (FF) 406 is inserted into the system. In a case where an input command is not an ID indicating the above-mentioned synchronization command and does not match this block's own ID, the delay adjustment flip-flop (FF) 406 outputs this command as is. Further included is a delay adjustment flip-flop (FF) 407 for mode flags 101, 201 and IDs 102, 202 that have been decoded by the decoder 401.

An encoder 408 is for generating an output command and data, and a selection signal 409 is for selecting an output from the encoder 408. A command/data output terminal 410 is for outputting a command and data. A clear signal 411 is for clearing a sequencer and buffer within the image processing unit 403.

Figure 5:
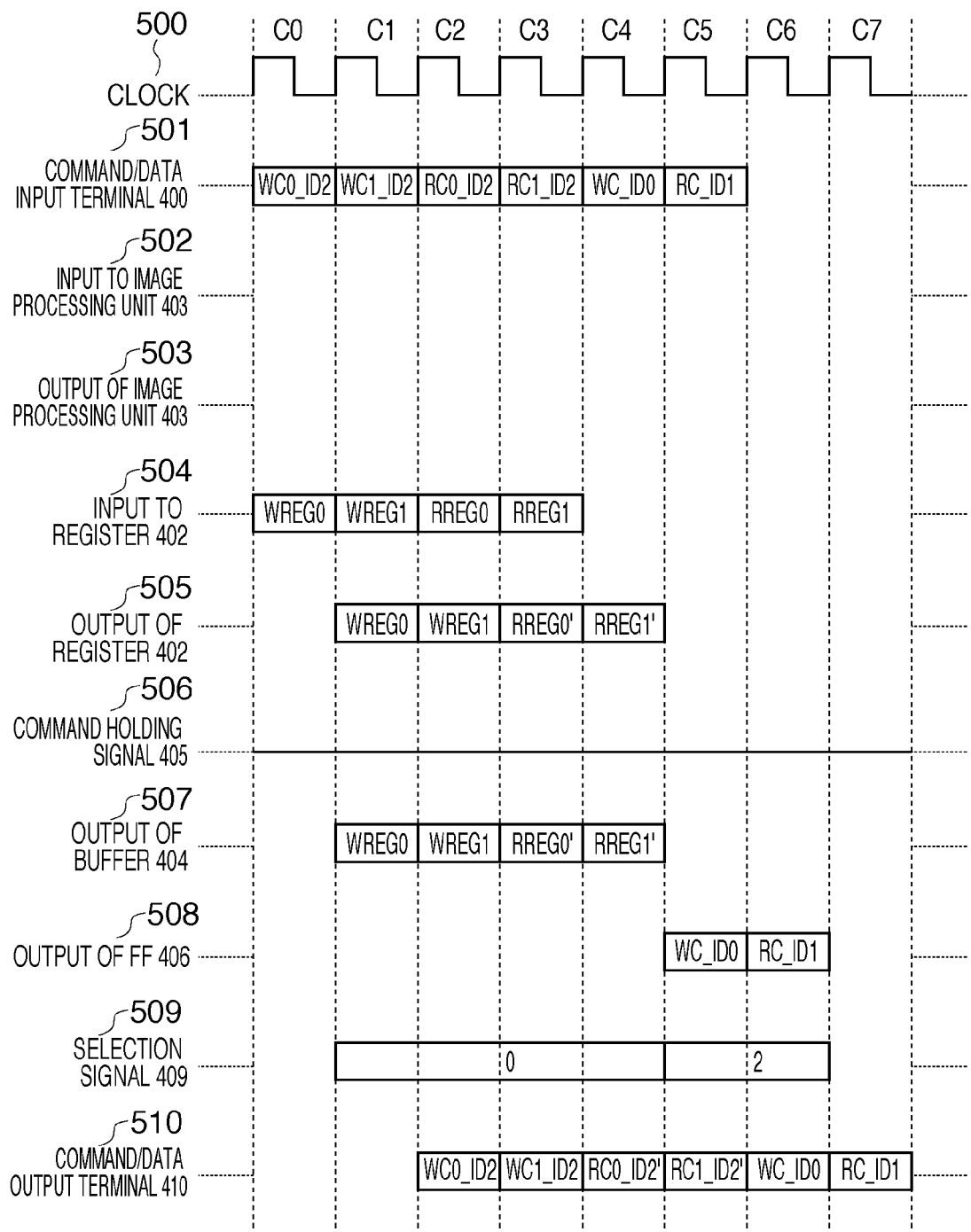
FIG. 5 is a diagram illustrating an example of timings of register read and write operations in image processing blocks according to this embodiment.

Next, reference will be had to FIG. 5 to describe register read and write operations of the image processing block shown in FIG. 4. It should be noted that a command and data that are input in each cycle of FIG. 5 are a command word (see FIG. 1) and a data word (see FIG. 2). Here "2" has been set as the ID of the image processing block of FIG. 4, and operation in a case where image processing is not in progress will be described. Here image processing is in progress from transmission of a data word whose start flag 202 is ON to transmission of a data word whose end flag 203 is ON.

Shown in FIG. 5 are timing 500 of a clock, timing 501 of input of commands and data at the command/data input terminal 400, timing 502 of an input to the image processing unit 403, timing 503 of an output from the image processing unit 403, timing 504 of inputs to the register 402, timing 505 of outputs from the register 402, status 506 of the command holding signal 405, timing 507 of outputs from the buffer 404, timing 508 of outputs from the FF 406, status 509 of the selection signal 409, and timing 510 of outputs of multiplexed commands and data at the command/data output terminal 410.

First, as indicated at 501, the following are input to the command/data input terminal 400 of the image processing block:
  in cycle C0, a write command for which ID 102=2 and address 104=0 holds;
  in cycle C1, a write command for which ID 102=2 and address 104=1 holds;
  in cycle C2, a read command for which ID 102=2 and address 104=0 holds;
  in cycle C3, a read command for which ID 102=2 and address 104=1 holds;
  in cycle C4, a read command for which ID 102=0 holds; and
  in cycle C5, a read command for which ID 102=1 holds.

These entered commands are decoded by the decoder 401. With regard to the commands for which ID 102="2" holds, the content of the RW flag 103, address 104 and register data 105 is output to the register 402. It should be noted that commands other than those for which the ID is "2" received in the case where image processing is not in progress are output to the FF 406 as is, delayed by one clock in the FF 406 and then output to the encoder 408.

Further, the mode flag 101 and ID 102 are output to the FF 407, delayed by one clock in the FF 407 and then output to the buffer 404. Further, since only commands are input in cycles C0 to C5, the decoder 401 outputs the selection signal 409 in conformity with two cycles, which represent the latency with respect to commands of the image processing block, as indicated at 509.

In other words, as indicated at 504, inputs to the register 402 are as follows:
  in cycle C0, RW flag 103=1, address 104=0 and register data 105 are input to the register 402;
  in cycle C1, RW flag 103=1, address 104=1 and register data 105 are input to the register 402;
  in cycle C2, RW flag 103=0, address 104=0 and register data 105 are input to the register 402; and
  in cycle C3, RW flag 103=0, address 104=1 and register data 105 are input to the register 402.

Further, as indicated at 508, outputs to the encoder 408 area as follows:
  the write command (WC_ID0) for which ID 102=0 holds that was input in cycle C4 is output from the FF 406 to the encoder 408 in cycle C5; and
  the read command (RC_ID1) for which ID 102=1 holds that was input in cycle C5 is output from the FF 406 to the encoder 408 in cycle C6.

Further, the encoder 408 selects the output of buffer 404 when the selection signal 409 is "0", selects the output of the image processing unit 403 when the selection signal 409 is "1", and selects the output of the FF 406 when the selection signal 409 is "2". Accordingly, as indicated at 509, the selection signal 409 is "0" in the period that covers cycles C1 to C4 and is "2" in the period that covers cycles C5, C6.

When the value of the RW flag 103 is "0", a register read operation of an address designated by address 104 is performed in the register 402, and the data read out is made the register data 105. The RW flag 103=0, address 104 and register data 105 at this time are output to the buffer 404. The register read operation is performed following the end of processing of the data that was input immediately before the register command. When the value of the RW flag 103 is "1", a register write operation that writes the content of the register data 105 to the address designated by the address 104 is carried out. The RW flag 103, address 104 and register data 105 at this time are output to the buffer 404.

At this time the register data that has been written is output to the image processing unit 403 as image processing parameters. Further, data that has entered from the image processing unit 403 and reflects the internal status, etc., can be mentioned as an example of the register-read data.

In other words, as indicated at 505 in FIG. 5, the outputs from the register 402 are as follows:

in cycle C1, the register 402 outputs RW flag 103=1, address 104=0 and register data 105 to the buffer 404 at the same time as the write operation to address 104=0 is performed;

in cycle C2, the register 402 outputs RW flag 103=1, address 104=1 and register data 105 to the buffer 404 at the same time as the write operation to address 104=1 is performed;

in cycle C3, the register 402 outputs RW flag 103=0, address 104=0 and register data 105 to the buffer 404 at the same time as the read operation to address 104=0 is performed; and in cycle C4, the register 402 outputs RW flag 103=0, address 104=1 and register data 105 to the buffer 404 at the same time as the read operation to address 104=1 is performed.

When the command holding signal 405 is "1", the entered data is held in the buffer 404. The command holding signal 405 takes on the value "1" in a case where transfer of a command of the register read operation, etc., has been performed during the image processing of a certain unit of data (page, block, band, etc.) in the decoder 401, that is, during data transfer. Since there is no command transfer during image processing in the example of FIG. 5, the value "0" is indicated as the status of the command holding signal 405. As a result, the entered mode flag 101, ID 102, RW flag 103, address 104 and register data 105 are output to the encoder 408 as is.

In accordance with the selection signal 409, the encoder 408 generates an output command that is in accordance with the format of the command shown in FIG. 1 and outputs this command from the command/data output terminal 410 after one clock cycle. In other words, as indicated at 509, 510 in FIG. 5, in the period of cycles C1 to C4, the selection signal 409 is "0" and therefore the encoder 408 selects the output of the buffer 404 and outputs the following to the command/data output terminal 410:

in cycle C2 after one clock cycle, the write command for which ID 102=2 and address 104=0 holds;

in cycle C3, the write command for which ID 102=2, address 104=1 holds;

in cycle C4, the read command for which ID 102=2, address 104=0 holds; and in cycle C5, the read command for which ID 102=2, address 104=1 holds.

Further, since the selection signal 409 has the value "2" in the period of cycles C5, C6, the encoder 408 selects the output of the FF 406 and outputs the following to the command/data output terminal 410:

in cycle C6 after one clock cycle, the write command (WC_ID0) for which ID 102=0 holds; and in cycle C7, the read command (RC_ID1) for which ID 102=1 holds.

Next, reference will be made to FIG. 6 to describe operation in a case where the image processing block shown in FIG. 4 executes reading of a register during image processing of a certain unit of data (page, block, band, etc.). Here image processing is in progress from transmission of a data word whose start flag 202 is ON to transmission of a data word whose end flag 203 is ON, as mentioned earlier. Further, in a manner similar to FIG. 5, "2" has been set as the ID of the image processing block, and latency with respect to the data of the image processing block is assumed to be four clock cycles. Further, latency with respect to a command in each image processing block is four cycles, in a manner similar to data, in a case where transmission is performed during image processing. It should be noted that the command and data that are input in each cycle of FIG. 6 are a command word (see FIG. 1) and a data word (see FIG. 2).

Figure 6:
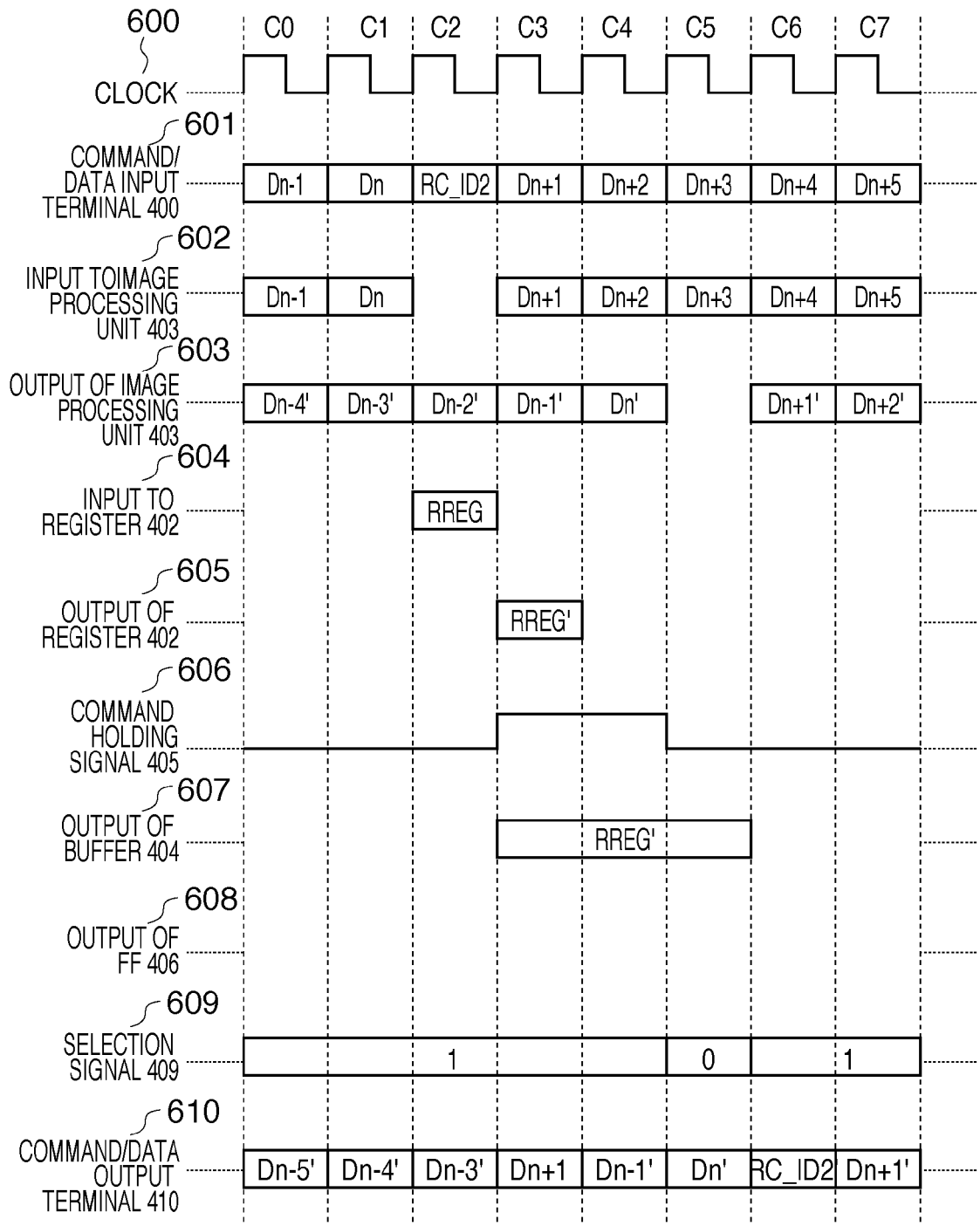
FIG. 6 is a diagram illustrating an example of timings of an image processing operation in image processing blocks according to this embodiment.

Shown in FIG. 6 are timing 600 of a clock, input status 601 of commands and data at the command/data input terminal 400, timing 602 of an input to the image processing unit 403, timing 603 of an output from the image processing unit 403, timing 604 of inputs to the register 402, timing 605 of outputs from the register 402, status 606 of the command holding signal 405, timing 607 of outputs from the buffer 404, timing 608 of outputs from the FF 406, status 609 of the selection signal 409, and timing 610 of commands and data at the command/data output terminal 410.

As indicated at 601, the following are input to the command/data input terminal 400:

in cycle C0, data Dn−1;

in cycle C1, data Dn;

in cycle C2, the read command (RC_ID2) for which ID 102=1 holds;

in cycle C3, data Dn+1;

in cycle C4, data Dn+2;

in cycle C5, data Dn+3;

in cycle C6, data Dn+4; and in cycle C7, data Dn+5.

The decoder 401 decodes these items of entered data and outputs the start flag, end flag and data to the image processing unit 403. Further, during image processing, the RW flag 103 of the command, address 104 and register data 105 are output to the register 402 irrespective of the value of the ID 102. The reason for this is to propagate the data and commands to the image processing block of the final stage while the sequential relationship of the data and commands is maintained, even if the ID 102 is a value other than "2".

Furthermore, the decoder 401 outputs the mode flag 101 and ID 102 to the FF 407. The mode flag 101 and ID 102 are delayed by one clock in the FF 407 and then output to the buffer 404. Further, data is input to the decoder 401 in periods other than that of cycle C2 in FIG. 6. It is determined, therefore, that image processing is in progress, and the selection signal 409 is output in conformity with a latency of four clocks with respect to commands in the image processing block, as indicated at 609.

In other words, as indicated at 602, the start flag, end flag and data are input to the image processing unit 403 in cycles C0, C1 and cycles C3 to C7. As indicated at 604, the address 104 and register data 105 are output to the register 402 in cycle C2. Further, as indicated at 609, the selection signal 409 is "1" in the periods that cover cycles C1 to C4 and C6, C7 and is "0" in the period of cycle C5.

The image processing unit 403 executes image processing at a latency of four clock cycles with respect to the entered data and outputs the start flag 202 and end flag 203 of the output data and the data 204 to the encoder 408.

Further, the register read operation described in connection with FIG. 5 is performed in the register 402. More specifically, as indicated at 605, at the same time the register 402 performs a read operation to the address 104 in cycle C3, it outputs the RW flag 103=0, address 104 and register data 105, which has been read out by this read operation, to the buffer 404.

Since the decoder 401 senses the register read command during image processing of a certain unit of data (page, block, band, etc.), it sets the command holding signal 405 to "1" in cycles C3 and C4. As a result, as indicated at 607, the buffer 404 outputs the entered mode flag 101, ID 102, RW flag 103, address 104 and register data 105 to the encoder 408 as is in cycle C3. The buffer holds these values in cycles C4 and C5.

The encoder 408 generates an output command in accordance with the format of the command shown in FIG. 1 and outputs this command from the command/data output terminal 410. In other words, as indicated at 609, the encoder 408 selects the output of the image processing unit 403 because the value of the selection signal 409 is "1" in the periods of cycles C0 to C4, C6, C7. The output is delivered to the command/data output terminal 410 in the cycle that follows one clock cycle. Further, in cycle C5, the value of the selection signal 409 is "0" and therefore the encoder 408 selects the output of the buffer 404. In cycle C6 that follows one clock cycle, the encoder 408 outputs the read command for which ID 102=2 and address 104=0 holds to the command/data output terminal 410.

In the example of FIG. 6, a timing chart for a case where the register read operation is performed during image processing is illustrated. However, the timing chart is similar also in a case where the register write operation is carried out. In the case of the register write operation, however, the updating of the register is performed by the time the next data processing operation starts.

Described next will be operation in a case where the synchronization command has been input to the image processing block shown in FIG. 4. Here the ID of the image processing block of FIG. 4 has been set to "2" in a manner similar to that described in FIGS. 5 and 6. Further, the ID 102 of the synchronization command is a value other than "2", and the input of the synchronization command is performed in a case where image processing is not in progress (i.e., the period from transmission of the start flag 202 to transmission of the end flag 203). Accordingly, operation with respect to the synchronization command is similar to that for commands WC_ID0 and RC_ID1 which have been input from the command/data input terminal 400 in cycles C4 and C5 of FIG. 5 and for which the ID 102 is other than "2". That is, after the synchronization command is decoded by the decoder 401, it is output to the command/data output terminal 410 as is via the FF 406 and encoder 408.

However, when the decoder 401 receives the synchronization command, it immediately outputs the clear signal 411 to the image processing unit 403 so that the sequencer and buffer within the image processing unit 403 are cleared to the initial state. Thus, the processing of the present sequence is terminated by the synchronization command and the buffer for image processing also is cleared. Consequently, while the processing of the present sequence is in progress, the command of the next sequence is no longer accepted and it is possible to prevent a malfunction in image processing.

In the foregoing embodiment, it may be so arranged that an ID that designates all of the image processing blocks (namely an "all designate ID") can be described in the ID 102 of the command word. In this case, each image processing block executes processing with respect to a command word in which the block's own ID or the all-designate ID has been described. The value of the ID 102 in the synchronization command in this case is a value other than the IDs of all of the image processing blocks and other than the all-designate ID.

Further, although the ID 102 of the synchronization command employs a value that does not duplicate those of the image processing blocks, this does not impose a limitation. For example, a specific address number with which each image processing block is not equipped may be described in the register address 104 as the address for the synchronization command, or an identifier for the synchronization command may be provided in the reserved area 106 (an area not being used in the command). In accordance with such a synchronization command, a register write operation or read operation is not performed in each image processing block.

Thus, in accordance with this embodiment as described above, processing of the present sequence is ended immediately and the buffer for image processing is cleared as well. Consequently, while the processing of the present sequence is in progress, the command of the next sequence is no longer accepted and it is possible to prevent a malfunction in image processing.

Other Embodiments

It should be noted that there are cases where the object of the invention is attained also by supplying a software program directly or remotely to a system or apparatus, reading the supplied program codes with a computer of the system or apparatus, and then executing the program codes. In this case, the program supplied is a program corresponding to flowcharts illustrated in the drawings of the embodiment.

Accordingly, since the functional processing of the present invention is implemented by computer, the program codes per se installed in the computer also implement the present invention. In other words, the present invention also covers a computer program that is for the purpose of implementing the functional processing of the present invention.

In this case, so long as the system or apparatus has the functions of the program, the form of the program, for example, object code, a program executed by an interpreter or script data supplied to an operating system, etc., does not matter.

Examples of storage media for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program of the present invention can be downloaded to a recording medium such as a hard disk. In this case, the program downloaded may be a file that is compressed and contains an automatic installation function. Further, implementation is possible by dividing the program codes constituting the program of the present invention into a plurality of files and downloading the files from different websites. In other words, a WWW server that downloads, to multiple users, the program files that implement the functional processing of the present invention by computer also is covered by the scope of the present invention.

Further, it is also possible to encrypt and store the program of the present invention on a storage medium such as a CD-ROM and distribute the storage medium to users. In this case, users who meet certain requirements are allowed to download decryption key information from a website via the Internet, the program decrypted using this key information can be executed and the program can be installed on a computer.

Further, besides implementing the functions of the embodiment by executing a read program using a computer, the functions of the embodiment may be implemented in cooperation with an operating system running on a computer, based upon commands from the program. In this case, the operating system, etc., executes some or all of the functions of actual processing and the functions of the above-described embodiments are implemented by this processing.

Furthermore, a program that has been read from a recording medium may be written to a memory provided on a function expansion board inserted into the computer or provided in a function expansion unit connected to the computer, and some or all of the functions of the embodiment may be implemented. In this case, after the program has been written to the function expansion board or function expansion unit, a CPU or the like provided on the function expansion board or function expansion unit performs some or all of the actual processing based upon the indications in the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-223091, filed Aug. 29, 2007, which is hereby incorporated by reference herein in its entirety.

What is claimed is:

1. An image processing method for an image processing apparatus in which a plurality of serially connected image processing blocks sequentially process image data input thereto, wherein each of the image processing blocks outputs data or commands, to the next image processing block available, in the order of input, said method comprising:
   a first transmission step of outputting a first command for controlling the plurality of image processing blocks to a leading image processing block;
   a second transmission step of outputting image data to be processed by the plurality of image processing blocks to the leading image processing block;
   a third transmission step of outputting a second command indicating an end of outputting the image data to be processed by the plurality of image processing blocks to the leading image block; and
   a fourth transmission step of outputting another first command to the leading image processing block in response to the second command output from a final image processing block.

2. The method according to claim 1, wherein said fourth transmission step includes outputting another first command and image data-to the leading image processing block when the second command is output from the final image processing block following the first command and the image data that has been processed by the plurality of image processing blocks.

3. The method according to claim 1, wherein the plurality of image processing blocks output the entered first command, image data and second command in the order of input.

4. The method according to claim 1, wherein
   the first command includes a read command for reading out data of a register possessed by a designated one of the plurality of image processing blocks, and
   when the read command is input thereto, the one designated image processing block outputs the first command inclusive of the data of the register.

5. The method according to claim 1, wherein when the second command is input, the plurality of image processing blocks clear buffers possessed by respective ones of the plurality of image processing blocks.

6. The method according to claim 1, wherein said first transmission step includes outputting the first command, which has been generated by a processor, to the leading image processing block.

7. The method according to claim 1, wherein said second transmission step includes outputting image data, which has been DMA-transferred from a memory, to the leading image processing block.

8. An image processing apparatus comprising:
   a plurality of serially connected image processing units which sequentially process image data input thereto, wherein each of said image processing units outputs data or commands, to the next image processing unit available, in the order of input;
   a first transmission unit which outputs a first command for controlling the plurality of image processing units to a leading image processing unit;
   a second transmission unit which outputs image data to be processed by the plurality of image processing units to the leading image processing unit;
   a third transmission unit which outputs a second command indicating an end of outputting the image data to be processed by said plurality of image processing units to the leading image processing unit; and
   a fourth transmission unit which outputs another first command to the leading image processing unit in response to the second command output from a final image processing unit.

9. The apparatus according to claim 8, wherein said fourth transmission unit outputs another first command and image data to the leading image processing unit when the second command is output from the final image processing unit following the first command and the image data that has been processed by said plurality of image processing units.

10. The apparatus according to claim 8, wherein said plurality of image processing units output the entered first command, image data and second command in the order of input.

11. The apparatus according to claim 8, wherein
   the first command includes a read command for reading out data of a register possessed by a designated one of said plurality of image processing units, and
   when the read command is input thereto, the one designated image processing unit outputs the first command inclusive of the data of the register.

12. The apparatus according to claim 8, wherein when the second command is input, said plurality of image processing units clear buffers possessed by respective ones of said plurality of image processing units.

13. The apparatus according to claim 8, wherein said first transmission unit outputs the first command, which has been generated by a processor, to said leading image processing unit.

14. The apparatus according to claim 8, wherein said second transmission unit outputs image data, which has been DMA-transferred from a memory, to said leading image processing unit.

15. A non-transitory computer-readable storage medium storing a computer program causing a computer to execute a method for an image processing apparatus in which a plurality of serially connected image processing blocks sequentially process image data input thereto, wherein each of the image processing blocks outputs data or commands, to the next image processing block available, in the order of input, said method comprising:
   a first transmission step of outputting a first command for controlling the plurality of image processing blocks to a leading image processing block;

a second transmission step of outputting image data to be processed by the plurality of image processing blocks to the leading image processing block;

a third transmission step of outputting a second command indicating an end of outputting the image data to be processed by the plurality of image processing blocks to the leading image block; and a fourth transmission step of outputting another first command to the leading image processing block in response to the second command output from a final image processing block.

16. The non-transitory computer-readable storage medium according to claim 15, wherein said fourth transmission step includes outputting another first command and image data to the leading image processing block when the second command is output from the final image processing block following the first command and the image data that has been processed by the plurality of image processing blocks.

17. The non-transitory computer-readable storage medium according to claim 15, wherein the first command includes a read command for reading out data of a register possessed by a designated one of the plurality of image processing blocks, and when the read command is input thereto, the one designated image processing block outputs the first command inclusive of the data of the register.

* * * * *